United States Patent [19]

Wittmann et al.

[11] Patent Number: 4,785,050
[45] Date of Patent: Nov. 15, 1988

[54] HIGH IMPACT STRENGTH, READILY FLOWING POLYAMIDE MOULDING MATERIALS

[75] Inventors: Dieter Wittmann, Krefeld; Christian Lindner, Cologne; Ludwig Trabert; Rudolf Binsack, both of Krefeld; Karl-Heinz Ott, Leverkusen, all of Fed. Rep. of Germany

[73] Assignee: Bayer Aktiengesellschaft, Leverkusen-Bayerwerk, Fed. Rep. of Germany

[21] Appl. No.: 907,315

[22] Filed: Sep. 15, 1986

[30] Foreign Application Priority Data

Sep. 25, 1985 [DE] Fed. Rep. of Germany ....... 3534088

[51] Int. Cl.$^4$ .............................................. C08L 77/00
[52] U.S. Cl. ..................................... 525/66; 525/179; 525/902
[58] Field of Search ........................ 525/66, 278, 179

[56] References Cited

U.S. PATENT DOCUMENTS

| | | | |
|---|---|---|---|
| 3,005,795 | 10/1961 | Busse et al. | 525/154 |
| 3,985,703 | 10/1976 | Ferry et al. | 525/66 |
| 4,086,300 | 4/1978 | Owens et al. | 525/66 |
| 4,338,406 | 7/1982 | Sanderson et al. | 525/66 |
| 4,338,409 | 7/1982 | Grigo et al. | 525/66 |
| 4,452,941 | 6/1984 | Kishida et al. | 525/66 |
| 4,495,324 | 1/1985 | Chacko et al. | 525/179 |
| 4,554,320 | 11/1985 | Reimann et al. | 525/183 |

FOREIGN PATENT DOCUMENTS

| | | | |
|---|---|---|---|
| 1203035 | 4/1986 | Canada | 525/66 |
| 0160914 | 11/1985 | European Pat. Off. | 525/66 |
| 1506430 | 4/1978 | United Kingdom . | |

Primary Examiner—John C. Bleutge
Assistant Examiner—A. Carrillo
Attorney, Agent, or Firm—Connolly & Hutz

[57] ABSTRACT

Readily processable moulding materials with improved impact strength of polyamides and graft products which have a particular chemical and physical structure.

6 Claims, No Drawings

HIGH IMPACT STRENGTH, READILY FLOWING POLYAMIDE MOULDING MATERIALS

The invention relates to easily processable hibh impact moulding compositions of polyamides and graft products which have a particular chemical and physical structure.

High impact thermoplastic polyamide moulding compositions which contain graft products i.e. reaction products of the polymerisation of resin-forming monomers in the presence of a rubber are known: thus, according to German Offenlegungschrift No. 2,435,266, such moulding materials contain graft products of vinyl monomers and (meth)acrylic acid on rubbers. According to Japanese Patent Application No. 2,354/1, styrene/acrylonitrile graft polymers can also be used. German Pat. No. 3,105,364 claims mixtures which contain graft products of (meth)acrylic acid esters on rubbers. The suitability of graft polymers the grafted branches of which predominantly consist of polyalkyl acrylate is emphasized in U.S. Pat. No. 4,167,505.

All of the moulding materials are thermoplastics with improved notched impact strength. However, an impairment in the thermoplastic propcessability must be accepted by the presence of the graft product, and in particular the flow properties of the moulding materials in the molten state is imparied, which leads to longer cycle times during injection moulding.

This disadvantage can be prevented by increasing the processing temperature and/or the injection pressure, causing, however, an increase in thermal degradation and energy consumption.

The moulding materials described in Offenlegungsschrift No. 2,941,025 of polyamide and graft products of mixtures of (meth)acrylic acid esters on rubbers have excellent toughness at low temperatures. However, the graft product is not completely stable under processing conditions, which may cuase disturbances during processing as thermoplastics and inadequate properties of the shaped articles.

Thus there is a demand for a polyamide moulding material which has improved toughness and processability in comparison with conventional polyamide moulding materials.

It has now been found that such moulding compounds result when graft products with specific rubber contents, particle sizes and degrees of crosslinking are used and when the grafted-on "branches" are made from specified combinations of methyl methacrylate and primary or secondary alkyl acrylates.

Usually increases in toughness (for example by increasing the graft rubber content or with a more highly viscous base polyamide) are achieved at the expense of the flow properties and improvements in processing properties (for example by flow auxiliaries) in generaly reduce the level of the toughness, both an improved toughness at low temperatures and improved flow properties are unexpectedly found here within a closely defined composition range of the grafting monomers.

This surprising effect is also maintained when the effect of the graft products in the polyamide moulding materials is increased by polytetrafluoroethylene or selected comonomers.

The invention thus relates to thermoplastic moulding materials of:

A. 35-99% by weight, preferably 50-97% by weight and particularly preferably 65-95% by weight of a polyamide, B. 1-65% by weight, preferably 3-50% by weight and particularly preferably 5-35% by weight of a graft product and C. 0-1% by weight, preferably 0.1-0.8% by weight and particularly preferably 0.2-0.7% by weight, based on the total weight A. and B., of polytetrafluoroethylene, the graft product B. consisting of B1. 65-85% by weight of a crosslinked elastomeric graft base in particle form with an average particle diameter ($d_{50}$) of 0.25-0.8 μm, a gel content of at least 70% by weight and a glass transistion temperature of $< -20°$ C., and B2. 35-15% by weight of a graft superstrate of vinyl polymer, which is present in grafted-on form on the rubber B1. to the extent of more than 40% by weight, based on B2., wherein the graft superstate has been obtained by graft polymerization of a monomer mixture of B2.1. 99-80 parts by weight, preferably 98-82 parts by weight and particularly preferably 97-85 parts by weight of methyl methacrylate, B2.2. 1-20 parts by weight, preferably 2-18 parts by weight and particularly preferably 3-15 parts by weight of a primary or secondary aliphatic acrylic acid ester with 2 to 10 C atoms in the alcohol part.

B2.3. 0-4 parts by weight, preferably 0.1-3 parts by weight and particularly preferably 0.2-2.5 parts by weight of a urethane with acrylic acid ester or methacrylic acid ester groups in the molecule which are capable of copolymerization with B2.1 and B2.2 and B2.4. 0-4 parts by weight, preferably 0.1-3 parts by weight and particularly preferably 0.2-2.5 or methacrylic acid, in the presence of an aqueous latex of the graft base B1.

Preferred moulding materials contain polytetrafluoroethylene (C) in highly disperse form. Moulding materials which contain graft products (B) of 65-85% by weight of a diene rubber or an acrylate rubber are furthermore preferred.

Particularly preferred moulding materials are those with graft products the graft superstrate of which is obtained by copolymerization of mixtures of (B2.1) 97-85 parts by weight of methyl methacylate, (B2.2) 3-15 parts by weight of a primary or secondary alkyl acrylate with 2-10 C atoms in the alcohol part of the molecule, (B2.3) 0.2-2.5 parts by weight of an acrylate urethane of the general formula I

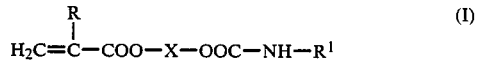

$R = H$ or $CH_3$
$X = C_2-C_{10}$-alkylene and
$R^1 = $ a $C_1-C_{18}$-hydrocarbon radical, or (B2.4) 0.2-2.5 parts by weight of a tertiary acrylic acid butyl ester. The amount of comonomers B2.3) and B2.4) is so small that even under processing conditions the surface quality of the moulding materials is not impaired by possibly given off split products. However, they improve properties e.g. in comparison with Offenlegungsschrift 2,941,025, due to synergistic effects with the methyl methacrylate/alkyl acrylate graft superstrate.

Suitable polyamides are amorphous and partly crystalline polyamides. Polyamide 6, polyamide 6,6 and corresponding co-polyamides can be employed as partly crystalline polyamides for the moulding materials according to the invention. Partly crystalline polyamides in which all or part of the acid component consists of terephthalic acid and/or isophthalic acid and/or suberic acid and/or sebacic acid and/or azelaic acid and/or adipic acid and/or cyclohexanedicarboxylic acid and all or some of the diamine component consists of m- and/or p-xylenediamine and/or hexamethylenediamine and/or 2,2,4-trimethylhexamethylenediamine and/or 2,4,4-trimethylhexamethylenediamine and/or isophoronediamine and which have a composition which is known from the prior art are furthermore possible.

Polyamides which are prepared completely or partly from lactams with 7–12 C atoms, if appropriate also using one or more of the above-mentioned starting components, may also be mentioned.

Particularly preferred partly crystalline polyamides are polyamide 6 and polyamide 6,6.

Amorphous polyamides are known in the art. They are obtained by polycondensation of diamines, such as ethylenediamine, hexamethylenediamine, decamethylenediamine, 2,2,4- and/or 2,4,4-trimethylhexamethylenediamine, m- and/or p-xylylenediamine, bis-(4-aminocyclohexyl)-methane, bis-(4-aminoccylohexyl)-propane, 3,3'-dimethyl-4,4'-diamino-dicyclohexylmethane, 3-aminomethyl-3,5,5-trimethyl-cyclohexylamine, 2,5- and/or 2,6-bis(aminomethyl)-norbornane and/or 1,4-diamino-methylcyclohexane with dicarboxylic acids, such as oxalic acid, adipic acid, azelaic acid, decanedicarboxylic acid, heptadecanedicarboxylic acid, 2,2,4- and/or 2,4,4-trimethyladipic acid, isophthalic acid or terephthalic acid. Copolymers which are obtained by polycondensation of several monomers and furthermore those copolymers which are prepared with the addition of aminocarboxylic acids, such as ε-aminocaproic acid, ω-aminoundecanoic acid or ω-aminolauric acid or their lactams, are of course also suitable.

Particularly suitable amorphous polyamides are the polyamides prepared from isophthalic acid, hexamethylenediamine and further diamines, such as 4,4'-diaminodicyclohexylmethane, isophoronediamine, 2,2,4- and/or 2,4,4-trimethylhexamethylenediamine or 2,5- and/or 2,6-bis(aminomethyl)-norbornane; or from isophthalic acid, 4,4'-diamino-dicyclohexylmethane and ε-caprolactam; or from isophthalic acid, 3,3'-dimethyl-4,4'-diamono-dicyclohexylmethane and laurolactam; or from terephthalic acid and the isomer mixture of 2,2,4- and/or 2,4,4-trimethylhexamethylenediamine.

Instead of the pure 4,4'-diaminodicyclohexylmethane, mixtures of the diaminodicyclohexylmethane position isomers which are composed of 70 to 99 mol % of the 4,4'-diamino isomer, 1–30 mol % of the 2,4'-diamino isomer, 0–2 mol % of the 2,2'-diamino isomer and, if appropriate, diamines with a correspondingly higher degree of condensation and which are obtained by hydrogenation of diaminodiphenylmethane of technical quality can also be used. Up to 30% of the isophthalic acid can be replaced by terephthalic acid.

The polyamides should preferably have a relative viscosity (measured on a 1% strength by weight solution in m-cresol at 25° C.) of 2.0–5.0, particularly preferably 2.5–4.0.

The graft copolymers of the invention contains elastomers with glass transition temperatures of less than −20° C., such as, for example, elastomers from the series comprising diene rubbers (in particular polybutadiene, polychloroprene and polyisoprene), olefine rubbers and acrylate rubbers (in particular homo- or copolymers of acrylic acid alkyl esters with up to 12 C atoms in the ester group, which can be copolymerized with polyfunctional unsaturated monomers for possible crosslinking). Preferred rubbers are polybutadiene and copolymers of butadiene with styrene- or acrylonitrile, and acrylate rubbers. Acrylate rubbers are particularly advantageous if they have a so called core-shell structure, i.e. they contain a core of a polymer other than acrylate rubber, which is surrounded by a shell of crosslinked alkyl acrylate rubber. Such rubbers are known.

The rubbers must be in partly crosslinked or highly crosslinked form. They have a particular structure with particles of average diameters of 0.25–0.8 μm (in particular 0.3–0.6 μm; $d_{50}$ values), and have gel contents of at least 70% by weight, preferably at least 80% by weight.

Of the vinyl graft superstrate B2 more than 40% by weight, preferably more than 50% by weight, are grafted on the elastomer component B1.

The graft superstrate B2 of the graft product B is produced by graft polymerization of appropriate monomers in the presence of an aqueous latex (emulsion) of the graft base B1. The polymerization can be initiated by free radical initiators, such as persulphates, peroxides, percarbonates or peresters, and in particular by water-soluble initiators, such as persulphates or redox initiator systems; such polymerizations are known.

To prepare the graft superstrate B2, a mixture of 99–80, preferably 97–85, parts by weight of methyl methacrylate, 1–20, preferably 3–15, parts by weight of a primary or secondary aliphatic acrylic acid ester (with 2–10 C atoms in the alcohol part of the molecule), in particular ethyl acrylate, propyl acrylate, butyl acrylate, hexyl acrylate or ethylhexyl acrylate, 0–4 parts by weight, preferably 0.2–2.5 parts by weight, of a urethane (II) or 0–4 parts by weight, preferably 0.2–2.5 parts by weight, of tertiary acrylic acid butyl esters are subjected to grafting polymerization in the presence of the emulsion of B1, in particular in the temperature range from 40° to 80° C.

Particularly suitable compounds (II) are adducts of monosiocyanates, and hydroxyalkylacrylic acid esters or -methacrylic acid esters, such as, for example

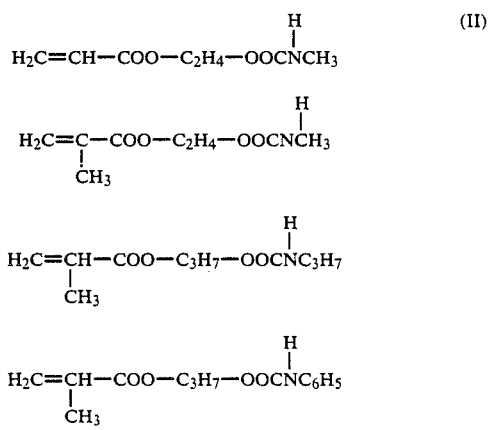

Preferred monosiocyanates are methyl-, ethyl-, propyl-, butyl-, cyclohexyl-, phenyl-, p-methoxyphenyl-, and p-methylphenylixocyanate.

The tetrafluoroethylene polymers which are suitable according to the invention are polymers with fluorine contents of 65-75% by weight, preferably 70-76% by weight. Examples are polytetrafluoroethylene, tetrafluoroethylene/hexafluoropropylene copolymers or tetrafluoroethylene copolymers with small amounts of fluorine-free copolymerizable, ethylenically unsaturated monomers. The polymers are known. They are employed as a fine-particled aqueous dispersion with a solids content of between 30 and 60% by weight. The particle diameter of the dispersed particles is 0.05-20 μm, preferably 0.08-10 μm. (Compare "Vinyl and Related Polymes" by Schildknecht, published by John Wiley and Sons, Inc., New York, 1952, pages 484-494; "Fluoropolymers" ("Fluorine polymers") by Wall, published by Wiley Interscience, Department of John Wiley and Sons, Inc. New York, 1972; and "Encyclopedia of Polymer Science and Technology", published by Interscience Publishers, Department of John Wiley and Sons, Inc., New York, Volume 13, 1970, pages 623-654).

In order to maintain the fine particles in the thermoplastic moulding material, component (C) must be introduced as follows: the aqueous emulsion of the graft polymer (B) is first mixed with an aqueous, fine-particled dispersion of (C); the mixture is then processed conventionally (for example by coagulation with salts, acids or bases and subsequent drying, or by spray-drying or freeze-drying). The resulting material, consisting of (B) and a proportion of (C), is then mixed with the polyamide (A) via the molten state (compounded).

If the fluorine polymer (C) is not introduced into the moulding material by this preferred process, the moulding materials do not contain (C) in the desired fine particle form; the content of (C) in the moulding materials must then be increased or a loss in the quality of the moulding materials must be accepted.

The polyamide moulding materials according to the invention can contain customary additives, such as lubricants and mould release agents, nucleating agents, stabilizers, fillers and reinforcing agents, flameproofing agents and dyestuffs.

The moulding materials can be prepared in the customary mixing units, such as mills, kneaders and single- and multi-screw extruders.

Although is most cases all the components are advantageously mixed in one step, it may sometimes also be advisable first to omit one or even two components and only to mix them in at a later point in time.

Thus, the moulding materials according to the invention can be prepared on the mixing units mentioned by melting the two components (A) and (B) together and homogenizing them, or by incorporating the graft polymer (B) into the melt of the polymer (A).

The temperature during preparation of the mixtures should be at least 10° C. and advantageously not more than 80° C. above the melting point of the polyamide.

The moulding materials according to the invention are suitable for injection moulding and extrusion where the properties described are required, such as, for example for bumpers and bodywork components of automobiles.

EXAMPLES

A. Components used / graft polymers according to the invention

I. Polyamide 6 with a relative viscosity (measured on a 1% strength by weight solution in m-cresol at 25° C.) of 3.0.

II. Polyamide 66 with a relative viscosity of 3.0, measured as for I.

III. Graft products.

Graft bases

IIIA:

Polybutadiene latex prepared by aqueous emulsion polymerization, with a polymer solids content of 50% by weight, an average particle diameter ($d_{50}$ value) of 0.4 μm and a gel content of 85% by weight.

IIIB:

Polybutadiene latex prepared by aqueous emulsion polymerization, with a polymer solids content of 40% by weight, an average particle diameter ($d_{50}$ value) of 0.15 μm and a gel content of 88% by weight.

IIIC:

Polybutadiene latex prepared by aqueous emulsion polymerization, with a polymer solids content of 50% by weight, an average particle diameter (d50 value) of 0.38 μm and a gel content of 49% by weight.

Polytetrafluoroethylene (PTFE)

A tetrafluoroethylene polymer dispersion with a solids content of 60% by weight was used; the particle diameter is between 0.05 and 0.5 μm (determined by ultracentrifugation measurements).

To prepare PTFE-containing graft products, the particular graft product latex is mixed with the PTFE latex (the composition of the polymers in this mixture can be seen from table 1, Example III 15 to III 19). The latex mixture is then coagulated at a pH value of 4-5 such that a mixture of graft product and PTFE in highly disperse form is formed.

Preparation of the graft products of Examples III 1 to III 29

Latices of the elastomer graft base are taken in a reactor so that 1,184 parts by weight of rubber are employed. In the case were elastomer IIIB is used, water is then added in an amount such that the polymer solids content of the initial material is 50% by weight. The latices are then in each case diluted further with water until a polymer solids content of 36.2% by weight has been established. The polymerization is started at a temperature of 65°-70° C. by addition of a solution of 3.5 parts by weight of potassium peroxodisulphate in 100 parts by weight of water. The following streams are then metered uniformly into the reactor at 65°-70° C. in the course of 4 hours, with stirring:

(1) 300 parts by weight of monomer mixture with the composition from Table 1

(2) 410 parts by weight of water, 29 parts by weight of the Na salt of disproportionated abietic acid and 22 parts by weight of 1N sodium hydroxide solution.

When the metering in has ended, further afterpolymerization is carried out at 65° C. After stabilization of the latex with 1.6% by weight of phenolic antioxidants and, if appropriate, mixing with PTFE latex, the polymer is worked up by coagulation by means of an acetic acid/$MgSO_4$ mixture at temperatures of 70°-98° C. After washing and drying the graft products, they are worked up to give a dry powder.

TABLE 1
Graft products used in the moulding materials

| Serial No. | Elastomer (80 parts by weight) Type | Composition of the grafting monomers (20 parts by weight) | | | | Polytetra-fluoroethylene (PTFE) content in the graft product |
|---|---|---|---|---|---|---|
| | | MMA (%) | nBA (%) | MUR (%) | tBA (%) | |
| III 1 | III A | 100 | 0 | | | |
| III 2 | III A | 95 | 5 | | | |
| III 3 | III A | 90 | 10 | | | |
| III 4 | III A | 85 | 15 | | | |
| III 5 | III A | 80 | 20 | | | |
| III 6 | III A | 75 | 25 | | | |
| III 7 | III A | 70 | 30 | | | |
| III 8 | III B | 100 | 0 | | | |
| III 9 | III B | 95 | 5 | | | |
| III 10 | III B | 90 | 10 | | | |
| III 11 | III B | 85 | 15 | | | |
| III 12 | III B | 80 | 20 | | | |
| III 13 | III B | 75 | 25 | | | |
| III 14 | III C | 90 | 10 | | | |
| III 15 | III A | 100 | 0 | | | 1,7% by weight |
| III 16 | III A | 95 | 5 | | | 1,7% by weight |
| III 17 | III A | 90 | 10 | | | 1,7% by weight |
| III 18 | III A | 85 | 15 | | | 1,7% by weight |
| III 19 | III A | 80 | 20 | | | 1,7% by weight |
| III 20 | III A | 98 | 0 | 2 | | |
| III 21 | III A | 93 | 5 | 2 | | |
| III 22 | III A | 88 | 10 | 2 | | |
| III 23 | III A | 83 | 15 | 2 | | |
| III 24 | III A | 78 | 20 | 2 | | |
| III 25 | III A | 98 | 0 | | 2 | |
| III 26 | III A | 93 | 5 | | 2 | |
| III 27 | III A | 88 | 10 | | 2 | |
| III 28 | III A | 83 | 15 | | 2 | |
| III 29 | III A | 78 | 20 | | 2 | |

MMA = methylmethacrylate
nBA = n-butylacrylate
MUR =

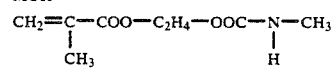

$$CH_2{=}C{-}COO{-}C_2H_4{-}OOC{-}N{-}CH_3$$
with CH$_3$ and H substituents tBA = t-butylacrylate B. Preparation and testing of the polyamide moulding materials

EXAMPLES 1–37

The components were melted and homogenized on a continuously operating twin-screw extruder. The barrel temperatures were chosen so that the material temperatures stated in Tables 2–6 were maintained. The molten strand was degassed before discharge from the nozzle, cooled in water, granulated and dried.

ASTM bars were produced from the moulding materials on an injection-moulding machine. The notched impact strength according to Izod was tested at various temperatures and the brittle-tough transistion was determined therefrom. The flow length was furthermore determined.

TABLE 2
Composition and properties of the moulding materials

| Example | Polyamide[1] Type | % by weight | Components Graft product Type (see Table 1) | n-butyl acrylate (% by weight of the graft shell) | % by weight | Brittle/tough transition (°C.) | Flow length (cm) |
|---|---|---|---|---|---|---|---|
| 1 | I[2] | 70 | III 1 | 0 | 30 | −30 | 27 |
| 2 | I | 70 | III 2 | 5 | 30 | −40 | 31 |
| 3 | I | 70 | III 3 | 10 | 30 | −45 | 35 |
| 4 | I | 70 | III 4 | 15 | 30 | −35 | 37 |
| 5 | I | 70 | III 5 | 20 | 30 | −25 | 39 |
| 6 | I[2] | 70 | III 6 | 25 | 30 | −20 | 40 |
| 7 | I[2] | 70 | III 7 | 30 | 30 | −20 | 41 |
| 8 | I[2] | 80 | III 1 | 0 | 20 | 0 | 34 |
| 9 | I | 80 | III 2 | 5 | 20 | −5 | 37 |
| 10 | I | 80 | III 3 | 10 | 20 | −10 | 39 |
| 11 | I | 80 | III 4 | 15 | 20 | 0 | 40 |
| 12 | I | 80 | III 5 | 20 | 20 | +5 | 41 |

[1]The material temperatures in the extruder and in the injection-moulding machine were 270° C.
[2]Comparison examples As can be seen from Table 2, at contents of up to 10 parts by weight of n-butyl acrylate in the graft shell of the graft product, a clear improvement both in the toughness at low temperatures and in the flow length are observed in polyamide moulding materials prepared therefrom. In the range according to the invention (up to 20 parts by weight of n-butyl acrylate in the graft shell of the graft product), the polyamide moulding materials have a quality in respect of the combination of flow properties and toughness at low temperatures which is superior to that of the comparison example. Only at higher contents of n-butyl acrylate (>20 parts by weight of the graft shell) does the clear loss in toughness at low temperature have an effect and overcompensates the slight gain in flow properties.

TABLE 3
Composition and properties of the moulding materials Comparison

| Example | Polyamide[1] Type | % by weight | Components Graft product Type (see Table 1) | n-butyl acrylate (% by weight of the graft shell) | % by weight | Brittle/tough transition (°C.) | Flow length (cm) |
|---|---|---|---|---|---|---|---|
| 13 | I | 70 | III 8 | 0 | 30 | −20 | 28 |
| 14 | I | 70 | III 9 | 5 | 30 | −15 | 29 |
| 15 | I | 70 | III 10 | 10 | 30 | −15 | 31 |
| 16 | I | 70 | III 11 | 15 | 30 | −10 | 32 |
| 17 | I | 70 | III 12 | 20 | 30 | −10 | 34 |
| 18 | I | 70 | III 13 | 25 | 30 | −5 | 35 |

[1]The material temperatures in the extruder and in the injection-moulding machine were 270° C.

TABLE 4

| | Polyamide[1] | | Components Graft product | n-butyl acrylate | | Brittle/ tough | |
|---|---|---|---|---|---|---|---|
| Example | Type | % by weight | Type (see Table 1) | (% by weight of the graft shell) | % by weight | transition (°C.) | Flow length (cm) |
| 19 | I | 70 | III 3 | 10 | 30 | −45 | 35 |
| 20 | I[2] | 70 | III 14 | 10 | 30 | −25 | 34 |
| 21 | I | 80 | III 3 | 10 | 20 | −15 | 39 |
| 22 | I[2] | 70 | III 14 | 10 | 20 | −5 | 37 |

[1]The material temperatures in the extruder and in the injection-moulding machine were 270° C.
[2]Comparison examples It can be seen from Tables 3 and 4 that the effect according to the invention—greater toughness and better processing properties—is not observed if graft polymers which have been obtained on the basis of elastomers with structural parameters (particle diameter and gel content) which are not according to the invention are used to prepare the polyamide moulding materials.

TABLE 5

| | Polyamide[1] | | Components Graft product | n-butyl acrylate | | Brittle/ tough | |
|---|---|---|---|---|---|---|---|
| Example | Type | % by weight | Type (see Table 1) | (% by weight of the graft shell) | % by weight | transition (°C.) | Flow length (cm) |
| 23 | I[2] | | III 15 | 0 | 30 | −30 | 26 |
| 24 | I | | III 16 | 5 | 30 | −35 | 29 |
| 25 | I | | III 17 | 10 | 30 | −40 | 33 |
| 26 | I | | III 18 | 15 | 30 | −35 | 35 |
| 27 | I | | III 19 | 20 | 30 | −25 | 36 |

[1]The material temperatures in the extruder and in the injection-moulding machine were 270° C.
[2]Comparison examples Re Table 5:

The addition of PTFE to the graft product increases the toughness level of the PA moulding materials without substantially influencing the position of the brittle-tough transistion. An Izod notched impact strength at room temperature of 1,068 J/m is thus found for moulding materials according to Example 3, whilst the moulding materials according to Example 25, which are comparable in respect to the basic type of graft product but additionally contain PTFE, have an Izod notched impact strength at room temperature of 1,247 J/m.

TABLE 6

| | Polyamide[1] | | Components Graft product | n-butyl acrylate | | Brittle/ tough | |
|---|---|---|---|---|---|---|---|
| Example | Type | % by weight | Type (see Table 1) | (% by weight of the graft shell) | % by weight | transition (°C.) | Flow length (cm) |
| 28 | I[1][2] | 70 | III 20 | 0 | 30 | −40 | 30 |
| 29 | I | 70 | III 21 | 5 | 30 | −50 | 33 |
| 30 | I | 70 | III 22 | 10 | 30 | −55 | 38 |
| 31 | I | 70 | III 23 | 15 | 30 | −45 | 39 |
| 32 | I | 70 | III 24 | 20 | 30 | −35 | 41 |
| 33 | II[1][2] | 70 | III 25 | 0 | 30 | −15 | 31 |
| 34 | II | 70 | III 26 | 5 | 30 | −20 | 32 |
| 35 | II | 70 | III 27 | 10 | 30 | −30 | 36 |
| 36 | II | 70 | III 28 | 15 | 30 | −25 | 38 |
| 37 | II | 70 | III 29 | 20 | 30 | −10 | 40 |

[1]The material temperatures in the extruder and in the injection-moulding machine were 270° C.
[2]Comparison examples Re Table 6:

The brittle/tough transition can be further reduced by incorporating suitable comonomers in the graft products according to the invention. The advantages observed in the range according to the invention; that is to say an optimum combination of toughness and rheological behaviour, are even intensified further by these comonomers. The effect according to the invention is thereby not limited to one type of polyamide, but occurs with all the polyamides investigated.

What is claimed is:

1. A thermoplastic moulding material comprising,
   (A) 35-99% by weight polyamide,
   (B) 1-65% by weight graft product, and
   (C) 0-1% by weight, based on total weight of A and B, of fine particles of polytetrafluoroethylene, where B comprises,
   (B1) 65-85% by weight of a graft base, where B1 is a particulate, cross-linked diene rubber having an average particle diameter (d50) of 0.25-0.8 μm, a gel content of at least 70% by weight and a glass transition temperature of less than −20° C. and
   (B2) 35-15% by weight of a graft superstrate obtained by graft polymerizing, in the presence of a latex of B1, onto B1, more than 40% by weight of a monomer mixture based on the weight of B1 and where the monomer mixture consists essentially of,
   (B2.1) 99-80 parts by weight methyl methacrylate,
   (B2.2) 1-20 parts by weight n-butyl acrylate, and
   (B2.3) 0-4 parts by weight of a urethane having acrylic acid ester or methacrylic acid ester groups in the molecule which are capable of copolymerization with B2.1 and B2.2.

2. Moulding materials according to claim 1, wherein component (C) is present in amounts of 0.1 to 0.8% by weight, and (C) is present in highly dispersed form.

3. A moulding material according to claim 1, wherein B2 is obtained by emulsion graft polymerizing B2 onto B1 and B2 consists of B2.1 and B2.2

4. Moulding materials according to claim 3, wherein polyamide 6, polyamide 66 or amorphous polyamide has been used as the polyamide component.

5. Process for producing the thermoplastic moulding composition of claim 1, wherein first an aqueous dispersion of (C) and a latex of (B) is mixed, the mixture is processed and the resulting solid product mixed with (A) via the melt.

6. A thermoplastic moulding material comprising,
(A) 35-99% by weight polyamide,
(B) 1-65% by weight graft product, and
(C) 0-1% by weight, based on total weight of A and B, of fine particles of polytetrafluoroethylene, where B comprises,
(B1) 65-85% by weight of a graft base, where B1 is a particulate, cross-linked diene rubber having an average particle diameter ($d_{50}$) of 0.25-0.8 μm, a gel content of at least 70% by weight and a glass transition temperature of less than $-20°$ C. and
(B2) 35-15% by weight of a graft superstrate obtained by graft polymerizing, in the presence of a latex of B1, onto B1, more than 40% by weight of a monomer mixture based on the weight of B1 where the monomer mixture consists essentially of
98-82 parts by weight methyl methacylate,
2-18 parts by weight primary $C_2$-$C_{20}$-alkyl acrylate,
0.1-3 parts by weight of a urethane having acrylic acid ester or methacrylic acid ester groups in the molecule which are capable of copolymerization with B2.1 and B2.2, and 0.1-3 parts by weight of a tertiary acrylic acid butyl ester.

* * * * *